Patented Mar. 20, 1934

1,951,618

UNITED STATES PATENT OFFICE 1,951,618

METHOD OF MAKING RUBBER SPONGE

Herbert Lindemann, Lichterfelde, Berlin, Germany

No Drawing. Application June 6, 1931, Serial No. 542,697. Renewed September 23, 1933

1 Claim. (Cl. 18—53)

This invention relates to the manufacture of what is commonly called rubber sponge.

Originally rubber sponge was made by adding to a rubber mix gas-producing raising ingredients which caused the mix to rise or expand during the process of vulcanization, in a manner somewhat similar in the way yeast acts to make dough rise while it is being baked into bread. The said mix was heated in a closed chamber to which steam was supplied, and the expansion took place while the temperature of the said mix was rising and throughout the period of vulcanization, with the result that, in the outside layer of the said mix, bubbles or pores appeared before they formed in the body of the mass and these bubbles acted to some extent as an insulation against the passage of heat into the middle of the mix. This made the process unsuitable for the manufacture of rubber sponge from thick slabs of rubber mix, because a crust formed on the surface of the rubber mix (somewhat similar to the crust formed on baked bread), owing to the necessarily higher heat under which vulcanization occurred at the surface of the mix than at the interior thereof. Finished products made by this process had little practical use.

To overcome the difficulties above mentioned, a process of making rubber sponge was developed some years ago, which was characterized by the heating of the rubber mix containing gas-producing raising ingredients in a chamber filled with water at the vulcanizing temperature and at the same time applying to the water a pressure sufficiently high to prevent expansion of the rubber mix by the formation of bubbles therein until the mix had been evenly heated throughout, or rather until the vulcanizing process had reached a certain stage and the mass had acquired a certain resiliency though still remaining malleable. The pressure of the water was then reduced, while maintaining the water at the vulcanizing temperature, and the gas-producing raising ingredients in the mix caused the mass to expand, which resulted in the formation of rubber sponge with bubbles or pores throughout its mass which was substantially homogeneous under proper conditions. This vulcanization took place in two periods, one often called the "pre-vulcanization" period, and the other the "post-vulcanization" period, although of course vulcanization took place during both periods. During the pre-vulcanization period the partly vulcanized rubber mix containing gas-producing raising ingredients remained at substantially its original size until it attained through partial vulcanization the proper firmness and resiliency to permit the satisfactory expansion of the mix under the influence of the gas-producing raising ingredients when the pressure was reduced. For the purpose of obtaining the rapid transmission and uniform distribution of heat to and throughout the batches of rubber mix, special boilers or vulcanizing chambers with double walls were used. The inner compartment, containing the batches of rubber mix containing the gas-producing raising ingredients, was filled with water and the desired high pressure was applied thereto. Steam was introduced into the outer compartment which resulted in the heating of the water in the inner compartment to the desired vulcanizing temperature. Attempts to obtain satisfactory results with the use of large chambers of this kind presented great difficulties, as it will be obvious that it is by no means easy, during the vulcanization period, to keep a large quantity of water at an even temperature throughout its mass. Water when heated has a tendency to form layers at different temperatures, the warm water being lighter and rising to the top; and the maintaining of a uniform temperature in a large quantity of water during the manufacture of such a delicate product as rubber sponge, was therefore a difficult problem. Moreover, there were many other disadvantages in this method, among which may be mentioned the question of the cost of heating the large quantities of water required for the manufacture of a comparatively small quantity of rubber sponge. Of course, lack of uniformity in the temperature of the water in various parts of the vulcanizing chamber resulted in lack of uniformity in the finished products derived from the separate masses of rubber mix containing the gas-producing raising ingredients being treated within the vulcanizing chamber.

Nor can steam instead of hot water be used for the heating medium in the two-step vulcanization process just described, for the following reasons. It is, of course, well known that the temperature of saturated steam depends upon its pressure. At ordinary atmospheric pressure, the temperature of saturated steam is 100° C.; and as the pressure is increased, as by the steam being generated in a closed vessel, its temperature increases. For example, the temperature of saturated steam at a pressure of 4 atmospheres is approximately 144° C.; and the temperature of saturated steam at 8 atmospheres is approximately 171° C. From this it is apparent that if an attempt were made to vulcanize a rubber mix containing the gas-producing raising ingredients in the production of rubber sponge at a vulcanizing temperature of 144° C. in the presence of saturated steam as the heating agent, the pressure corresponding to this temperature would be 4 atmospheres; and if to prevent expansion of the said mix the steam pressure were raised during the pre-vulcanizing period to 8 atmospheres, then the temperature of the steam during that period would be 171° C., which would be excessive and undesirable. The utilization of steam alone at various pressures in the vulcanizing and raising of such a rubber mix to produce rubber sponge would, therefore, be unsatisfactory.

The defects of the processes just described are avoided by the new process which is the subject of the present invention and which will now be described.

The present invention utilizes the fact recognized in physics, that a mixture of steam and a neutral gas, for example air, hydrogen, nitrogen, oxygen, acetylene, carbon monoxide, carbon dioxide, etc., may exist at high pressures at a temperature lower than the temperature of saturated steam at that pressure. For example, mixtures of steam and neutral gas in a chamber may have a temperature of substantially 144° C. both at a pressure of 4 atmospheres and at a pressure of 8 atmospheres. Moreover, the temperature throughout the chamber containing the mixture of steam and gas is substantially uniform. The present invention utilizes the physical facts just mentioned in the manufacture of rubber sponge, in the following way: The batches of rubber mix containing the usual gas-producing raising ingredients, from which rubber sponge is to be made, are placed on shelves or trays in a chamber which is capable of being tightly closed and which is connected to suitable sources supplying steam and a neutral gas at high pressures, say 12 atmospheres. The operator, by admitting to the chamber regulated amounts of gas and steam, may raise the pressure in the chamber to the desired pressure of, say, 8 atmospheres, and to the desired temperature of, say, 144° C., and may maintain this temperature and pressure during the pre-vulcanization period. The operator may then, by means of a release valve, reduce the pressure in the chamber to, say, 4 atmospheres, at the same time maintaining the temperature at the desired value of 144° C. by the admission of steam from the source of supply. It is also an easy matter for the operator to maintain this desired pressure and temperature during the post-vulcanization period, through the manipulation of the gas inlet valve, steam inlet valve and exhaust valve. Of course, the operator is at all times kept informed regarding the conditions within the chamber by observing a pressure gauge and thermometer responding to the conditions within the chamber. When the treatment of the rubber mix containing the gas-producing raising ingredients is completed, the pressure in the chamber is released to atmospheric pressure, whereupon the chamber can be opened and the rubber sponges removed.

The method just described can be satisfactorily employed in large chambers containing a large number of batches of rubber mix containing the gas-producing raising ingredients, because the temperature of a mixture of steam and neutral gas is far more uniform throughout such a mixture than is the temperature of a corresponding volume of water. In other words, the method just described insures the even distribution of heat at the desired temperature throughout the chamber in which batches of the said rubber mix are treated at different pressures in the production of rubber sponges. Of course the pressures and vulcanizing temperatures herein mentioned are merely illustrative; and the invention is not confined to use with them.

What is claimed is:

The method of making rubber sponge which consists in vulcanizing a rubber mix containing gas-producing raising ingredients in two stages; first, by heating it in a chamber containing a mixture of gas introduced at substantial pressure and steam introduced at approximately the proper vulcanizing temperature thereby providing in the chamber the proper vulcanizing temperature and a pressure sufficient to substantially prevent expansion of the mix under the influence of the gas-producing raising ingredients; and then, after partial vulcanization, reducing the pressure to permit expansion of the mix under the influence of said ingredients while maintaining the proper vulcanizing temperature by the introduction of steam, until vulcanization of the rubber sponge is complete.

HERBERT LINDEMANN.